H. N. STRONG.
Hooks for Hanging Tobacco.
No. 141,899. Patented August 19, 1873.
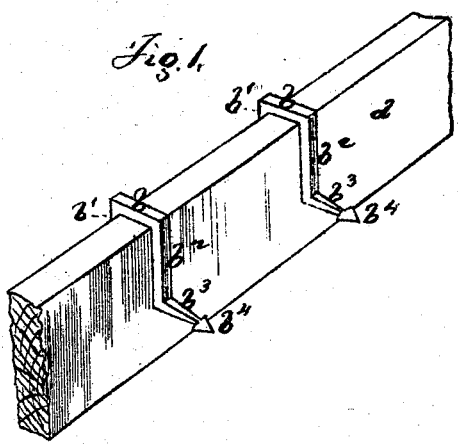
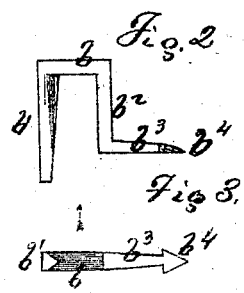
WITNESSES.
H. B. Weaver.
John Pollitt
INVENTOR.
Henry N. Strong
By Wm Ed Simonds
Atty

UNITED STATES PATENT OFFICE.

HENRY N. STRONG, OF PORTLAND, CONNECTICUT.

IMPROVEMENT IN HOOKS FOR HANGING TOBACCO.

Specification forming part of Letters Patent No. 141,899, dated August 19, 1873; application filed April 16, 1873.

*To all whom it may concern:*

Be it known that I, HENRY N. STRONG, of Portland, in the county of Middlesex and State of Connecticut, have invented an Improved Hook or Hanger for Hanging Tobacco-Plants, of which the following is a specification, reference being had to the accompanying drawings, in which—

Figure 1 is a view of a part of a wooden lath with two of my improved hooks affixed thereto. Fig. 2 is a side view of one of the hooks. Fig. 3 is a bottom view of one of the hooks.

When tobacco-plants are harvested from the field where they are grown it is necessary that each plant should be suspended separately by its stalk for curing purposes. This has heretofore been done in a variety of ways. Some tobacco growers have used cord and tied up each plant separately; some have spitted the plants upon wooden laths by means of a spear placed upon the end of the lath.

My invention is an improved form and construction of hook for this purpose.

In the drawings, $a$ indicates a common wooden lath, such as is used for hanging tobacco upon; the stalks are spitted upon lath. $b\ b$ indicate two of my hooks, in Fig. 1. The hook is so shaped as to slip upon the top of the lath, and to wedge upon the lath when pushed down. This wedging is effected by inclining one of the legs $b^1\ b^2$, preferably the leg $b^1$. From the leg $b^2$ projects an arm or finger, $b^3$, having a spear-shaped point, $b^4$, the projections of which spear-point are lateral from the finger $b^3$ and not vertical.

In order to make the hook wedge more readily upon the lath the inner side of the leg $b^1$ may be brought to an edge, as seen in Fig. 3.

The lath is to be supported in a horizontal position, and the stalk of the plant is held horizontally while it is forced upon the spear-point $b^4$, and the plant is then allowed to drop to a perpendicular. In so doing the spear-point is made to enter the stalk between the fibers of the plant, and thus avoid splitting the stalk. The spear-head penetrates to the soft core of the stalk, and after the plant comes back to a perpendicular the plant cannot escape from the hook by accident.

It is not necessary that the lath should be square or rectangular in cross-section, as shown in the drawing; but it may be of any convenient and suitable shape, and the hook be made to fit it. The inclining of one or the other of the legs $b^1\ b^2$ allows the hook to be used, within proper limit, upon laths of different thickness, and the giving an edge to the leg $b^1$ also prevents the hook from moving sidewise upon the lath.

Instead of placing the hook upon the lath before the plant is hung upon the hook the spear-point may be introduced into the stalk before placing upon the lath, and this latter method I prefer.

I claim as my invention—

A tobacco-hook, having one of its legs, as $b^1$, inclined, as shown, and having a laterally-expanded spear-point, $b^4$, all constructed and designed for use upon a lath, substantially as described.

HENRY N. STRONG.

Witnesses:
WM. E. SIMONDS,
JOHN POLLITT.